Feb. 24, 1959     A. E. MARTIN ET AL     2,874,564
SONIC GAS ANALYSERS
Filed Nov. 15, 1955
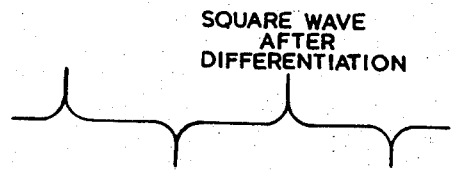
Fig. 1.
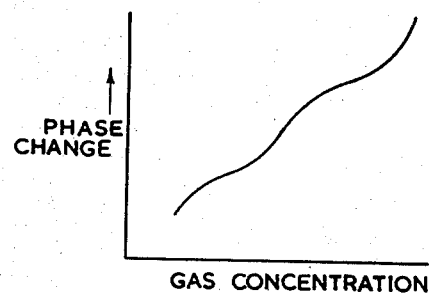
Fig. 2.
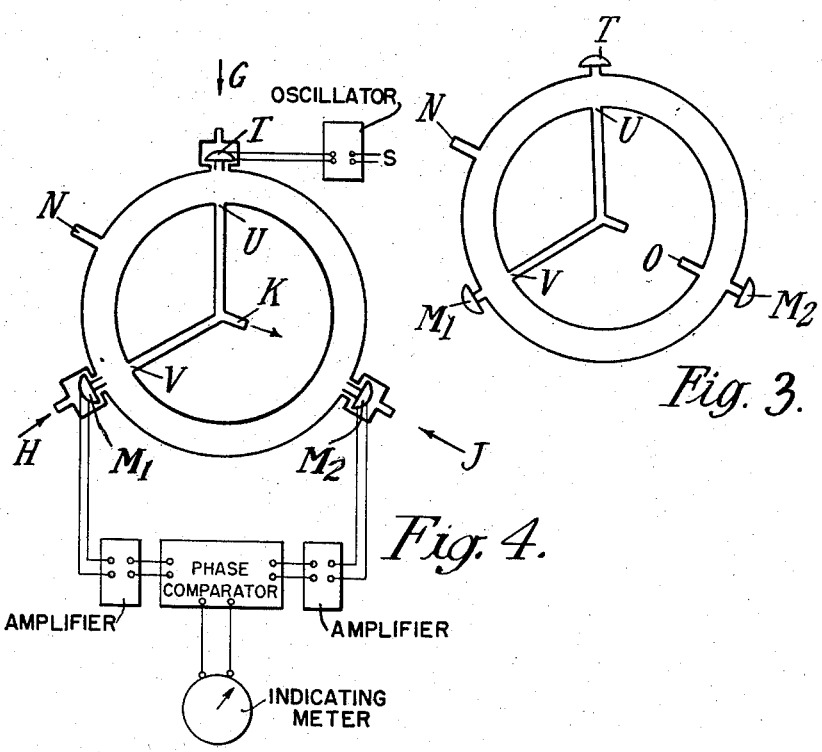
Fig. 3.
Fig. 4.

United States Patent Office 2,874,564
Patented Feb. 24, 1959

2,874,564

SONIC GAS ANALYSERS

Albert E. Martin and Donald Mounfield, Newcastle-upon-Tyne, England, assignors to Sir Howard Grubb, Parsons & Company Limited, Newcastle-upon-Tyne, England Application November 15, 1955, Serial No. 546,988

Claims priority, application Great Britain November 17, 1954

2 Claims. (Cl. 73—24)

Sonic or acoustic gas analysers depend on the fact that the velocity of sound in gases varies from one gas to another, so that variations in composition can be related to changes in velocity. In one known instrument a source of sound is excited electrically at a constant frequency $f$ of several thousand cycles per seocnd, and some of the acoustic energy is received by a microphone located at a distance $d$ from the source. If the velocity of sound in the gas surrounding the source and receiver is $V_1$, the finite time required for sound waves to traverse the distance $d$ will cause a time lag of $$\frac{d}{V_1}$$

or an angular lag of $$\frac{2\pi df}{V_1}$$

at the microphone. If the gas is now changed to one having a velocity $V_2$, the phase of the voltage at the microphone changes by $$\theta = 2\pi d\left(f\frac{1}{V_1} - \frac{1}{V_2}\right) \quad (1)$$

It is not necessary to measure the absolute phase lag of the voltage at the microphone relative to that at the source, but merely the relative phase shift at the microphone as the gas mixture is varied. Normally to avoid ambiguity the phase shift is not allowed to exceed $2\pi$.

In order to measure the phase change an electronic circuit is employed in which D. C. is caused to flow at a certain point on the A. C. wave used for exciting the source of sound, while said current is switched off at a suitable point on the A. C. wave derived from the amplified output from the microphone, or vice versa. This interrupted D. C. is passed through a meter and owing to the high frequency of interruption and inertia of the measuring instrument gives a steady deflection which changes as the value of $\theta$ varies.

In order to obtain accurate switching of the D. C. used for deflecting the indicating meter, the sinusoidal waves applied to the transmitter and received from the microphone are first squared and then differentiated by circuits well known to those versed in the art so that sharp pips are produced as shown in Figure 1 of the accompanying diagrammatic drawings.

Owing to the magnitude and sharpness of these pips the meter indication is accurately proportional to the phase shift $\theta$ and only dependent to an insignificant degree on the absolute magnitude of the pips. Only pips of one polarity are used to switch D. C. on or off so that the repetition frequency of switching is $f$.

The above means of measuring $\theta$ is given by way of example; any available alternative means can equally well be employed.

Equation 1, however, is only true in the absence of standing waves since these react back on the transmitter and alter the phase relationship between movement of the diaphragm and the alternating voltage applied to the transmitter; this effect can be very large as is indicated in Figure 2.

An object of the present invention is to reduce this effect as far as possible and to obtain a stable instrument with reasonably linear calibration.

One means for eliminating standing waves is a tube lining of soft, sound absorbing material and a soft poorly reflecting surface at the reflecting end of the tube. Unfortunately, the use of soft material inside the tube is unsatisfactory in many sonic gas analysers, since difficulty is experienced in purging the sample tube and replacing with fresh sample; also the lining material is liable to absorb water or organic vapours.

The present invention enables the effect of standing waves to be reduced without recourse to soft sound absorbing materials.

The invention consists in a method and means of inhibiting the effect of standing waves in a sonic or acoustic gas analyser according to which sound from the transmitter is passed into a continuous annular space so as to travel by separate paths to actuate two microphones, one path being by way of sample gas and the other by way of a datum gas.

In the drawing,

Fig. 1 is a diagram of a wave form used in the instrument of the invention;

Fig. 2 is a graph showing the relationship of phase change to gas concentration;

Fig. 3 is a schematic of one form of instrument embodying the invention; and

Fig. 4 is a similar schematic showing a modified form of instrument.

In carrying the invention into effect according to a preferred mode as shown in diagrammatic Figure 3, T is a sound transmitter in which a diaphragm is caused to vibrate at the impressed frequency and a continuous annular space in the form of a circular tube is employed.

A convenient form of transmitter is of the type used in deaf aids and may be electromagnetic or piezo-electric in action; $M_1$ and $M_2$ are two microphones approximately equi-distant from each other and from T. The amplified output from microphone $M_1$ (or $M_2$) provides the signal which initiates the flow of D. C. through the indicating meter while the signal from $M_2$ (or $M_1$) shuts off said flow of current. The meter indication thus depends directly upon the phase difference $\theta$ between the signals from $M_1$ and $M_2$ and therefore upon the composition of the gas contained in the tube. Sample gas is fed into the tube at N, approximately half-way between T and $M_1$, while a datum gas such as dry $CO_2$-free air is fed in at O approximately half-way between T and $M_1$.

Outlet tubes U, V are fitted at points opposite T and $M_1$. By careful control of the gas flow into N and O, the mixing of the two gases in the spaces between T and $M_1$ and T and $M_2$ can be kept to a minimum.

Standing waves are greatly reduced since no reflecting surfaces exist, except slight discontinuities at the inlet and outlet points and also where T, $M_1$ and $M_2$ are connected to the circular tube.

In order to explain the mode of operation of this form of instrument, the total path length will be assumed to be made up of $d_1$ in sample gas (velocity of sound $V_1$) and $d_2$ and $d_3$ in the datum gas for which the velocity of sound is $V_2$. Now microphone $M_1$ will receive one signal from the transmitter T via path $d_1$ and a second signal via path $d_2+d_3$, while microphone $M_2$ will receive one signal from T via path $d_2$ and a second signal via path $d_1+d_3$. These signals can be represented as follows:

$$M_1 = \begin{cases} a_1 \sin (wt+\alpha_1) \\ a_2 \sin (wt+\alpha_2+\alpha_3) \end{cases}$$

$$M_2 = \begin{cases} a_3 \sin (wt+\alpha_2) \\ a \sin (wt+\alpha_1+\alpha_3) \end{cases}$$

where $\alpha_1$, $\alpha_2$ and $\alpha_3$ are the phase changes associated with paths $d_1$, $d_2$ and $d_3$.

Two cases can be considered: (1) in which the attenuation of the signal in passing round the tube is small, so that $$a_1 = a_2 = a_3 = a_4 = a \text{ (say)}$$

The resultant signal received by $M_1$ is then $$= a [\sin (wt+\alpha_1) + \sin (wt+\alpha_2+\alpha_3)] =$$

$$2a \cos \frac{(\alpha_2+\alpha_3-\alpha_1)}{2} \times \sin \left( wt + \frac{\alpha_1+\alpha_2+\alpha_3}{2} \right)$$

and the resultant signal received by $M_2$ is similarly $$a [\sin (wt+2)\alpha + \sin (wt+\alpha_1+\alpha_3)] =$$

$$2a \cos \frac{(\alpha_1+\alpha_3-\alpha_2)}{2} \sin \times \left( wt + \frac{\alpha_1+\alpha_2+\alpha_3}{2} \right)$$

It will be seen that the resultant signals received by $M_1$ and $M_2$ are exactly in phase although, in general, the amplitude is different for both, so that no phase shift dependent on the nature of the sample gas obtained.

In the second case (2) it will be assumed that the signal attenuates rapidly, so that the contribution received via the longer path can be ignored compared with the direct signal. The signals received by $M_1$ and $M_2$ can therefore be represented as:

$$M_1 = a_1 \sin (wt+\alpha_1)$$

$$M_2 = a_3 \sin (wt+\alpha_2)$$

and here the phase difference $\alpha_1-\alpha_2$ has the value given by Equation 1, i. e.

$$2\pi f \left( \frac{d_1}{v_1} - \frac{d_2}{v_2} \right)$$

and this varies as the composition of the sample gas alters.

In practical cases a result between these extremes is found, i. e. intermediate between zero and $$2\pi f \left( \frac{d_2}{v_2} - \frac{d_1}{v_1} \right)$$

In an alternative form of the circular tube shown in Figure 4, a small trickle of $CO_2$-free air is led in at G and H, while the main air inlet is at J. Sample gas is introduced at N and the rates for air and sample are made nearly equal so that sample occupies the part of the tube between $M_1$ and T, while air fills the remainder of the tube.

The sample gas and air leave finally at K. This arrangement is particularly useful for corrosive gases since the sample gas does not come into contact with the transducers and the tube itself can be made of glass.

Further, if the sample gas is to be examined at an elevated temperature the pipes connecting the transducers to the circular tube can be lengthened so that the transducers operate at normal temperature while the circular tube is heated to its working temperature.

We claim:

1. In a sonic gas analyser of the type wherein relative phase shift is the measure of the variable, the improvement comprising a ring in the form of a continuous tube defining a continuous annular internal space, a sound transmitter mounted adjacent the tube for transmission of sound in opposite directions through the tube, a first microphone and a second microphone spaced around the tube at approximately equal distances from the transmitter and adapted to receive sound transmitted through gas in the tube, inlet means for gas to be tested between the transmitter and said first microphone, inlet means for a datum gas diametrically opposite the inlet for gas under test, and outlet means for both gas to be tested and the datum gas adjacent the transmitter and the said first microphone, whereby sound is transmitted from the transmitter to each said microphone by two paths, going through the annular tube in opposite directions, so that the effect of standing waves is inhibited.

2. In a sonic gas analyser of the type wherein relative phase shift is the measure of the variable, the improvement as claimed in claim 1 in which the microphones and transmitters are housed in chambers in communication with the inside of the tube which chambers are filled with a datum gas.

References Cited in the file of this patent
UNITED STATES PATENTS 2,328,546    Cafarelli _____ Sept. 7, 1943

FOREIGN PATENTS 404,809    Germany _____ Oct. 21, 1924
520,484    Germany _____ Mar. 23, 1931

OTHER REFERENCES

Article by T. P. Abello, Physical Review, vol. 31, June 1928, pages 1083–1091.